(12) United States Patent
Schmidt et al.

(10) Patent No.: US 12,136,303 B2
(45) Date of Patent: *Nov. 5, 2024

(54) AUTOMATED INSPECTION OF AUTONOMOUS VEHICLE LIGHTS

(71) Applicant: GM Cruise Holdings LLC, San Francisco, CA (US)

(72) Inventors: Michael Frank Schmidt, Scottsdale, AZ (US); Jeffrey Brandon, Phoenix, AZ (US); Erik Nielsen, Glendale, AZ (US); Chase Kaufman, Scottsdale, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,331

(22) Filed: Oct. 16, 2023

(65) Prior Publication Data

US 2024/0038006 A1 Feb. 1, 2024

Related U.S. Application Data

(63) Continuation of application No. 17/891,420, filed on Aug. 19, 2022, now Pat. No. 11,823,508, which is a continuation of application No. 16/744,913, filed on Jan. 16, 2020, now Pat. No. 11,455,849.

(51) Int. Cl.
*G07C 5/00* (2006.01)
*B60R 11/04* (2006.01)
*G05D 1/00* (2024.01)
*G06Q 10/20* (2023.01)
*G06T 7/00* (2017.01)
*G07C 5/08* (2006.01)

(52) U.S. Cl.
CPC ............ *G07C 5/0891* (2013.01); *B60R 11/04* (2013.01); *G05D 1/0088* (2013.01); *G06Q 10/20* (2013.01); *G06T 7/0002* (2013.01); *G07C 5/008* (2013.01); *B60R 2300/60* (2013.01)

(58) Field of Classification Search
CPC .... G07C 5/0891; G07C 5/008; G07C 5/0808; B60R 11/04; B60R 2300/60; G05D 1/0088; G06Q 10/20; G06T 7/0002; G06T 2207/10024; G06T 2207/30252; G06T 7/001
See application file for complete search history.

(56) References Cited

U.S. PATENT DOCUMENTS 11,455,849 B2 * 9/2022 Schmidt ................ G06T 7/0002
11,823,508 B2 * 11/2023 Schmidt ............... G05D 1/0088

* cited by examiner

*Primary Examiner* — Yonel Beaulieu

(57) ABSTRACT

A light inspection system positions an autonomous vehicle (AV) in a field of view of a camera such that the camera captures an image of a light of the AV. The light inspection system instructs a camera to capture an image of the light while the light is switched on. The light inspection system receives the captured image, determines a luminance of the light based on the image, and determines to service the light in response to the luminance of the light being below a threshold luminance.

20 Claims, 6 Drawing Sheets

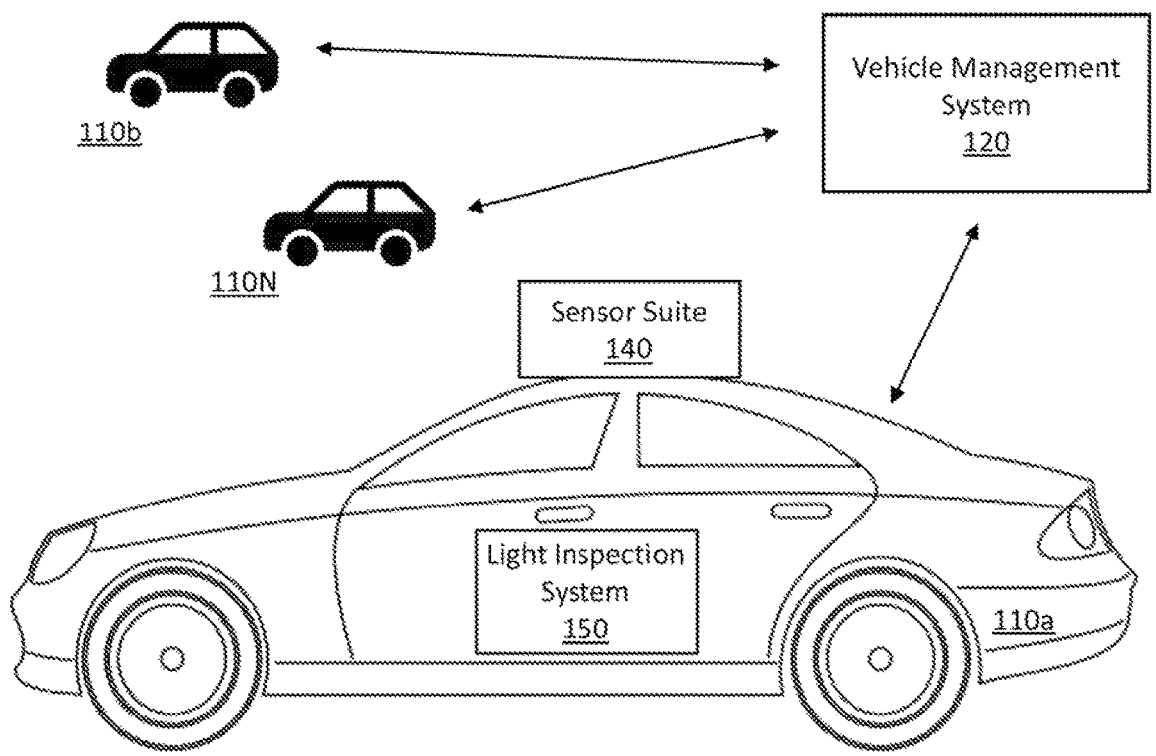
Figure 1
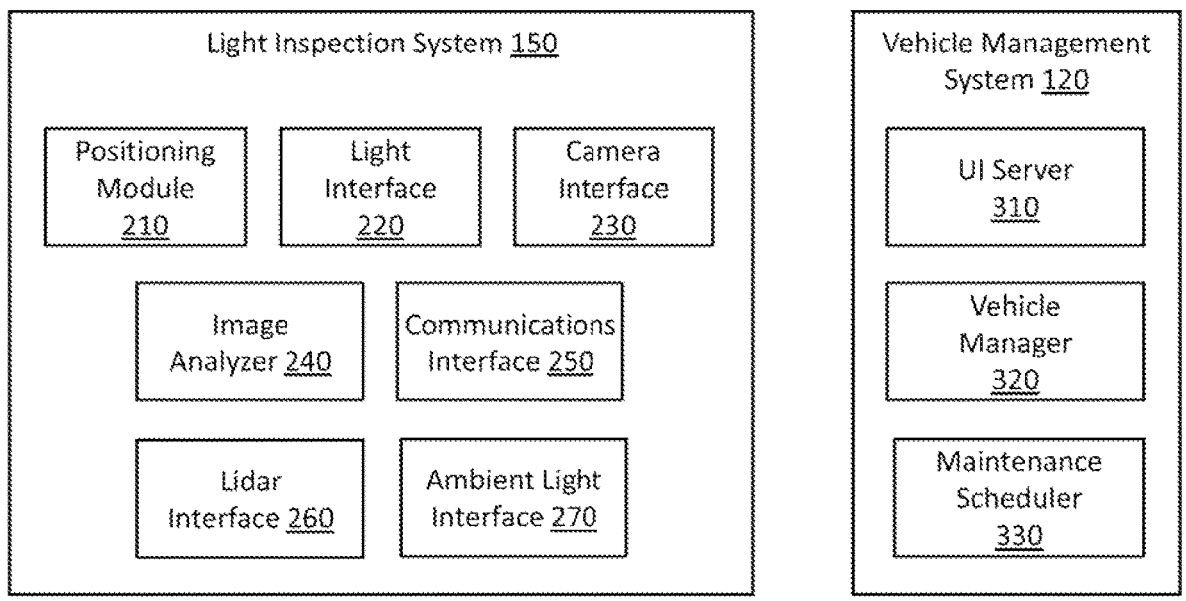
Figure 2
Figure 3

AUTOMATED INSPECTION OF AUTONOMOUS VEHICLE LIGHTS

CROSS-REFERENCE TO RELATED APPLICATIONS

This application is a continuation (and claims the benefit of priority under 35 U.S.C. § 120) of U.S. application Ser. No. 17/891,420, filed Aug. 19, 2022, now U.S. Pat. No. 11,823,508, and entitled, "AUTOMATED INSPECTION OF AUTONOMOUS VEHICLE LIGHTS," which is a continuation U.S. application Ser. No. 16/744,913, filed Jan. 16, 2020, now U.S. Pat. No. 11,455,849, and entitled, "AUTOMATED INSPECTION OF AUTONOMOUS VEHICLE LIGHTS." The disclosures of these applications are considered part of (and are incorporated by reference in) this application.

TECHNICAL FIELD OF THE DISCLOSURE

The present disclosure relates generally to autonomous vehicles (AVs) and, more specifically, to devices and methods for automated inspection of AV lights.

BACKGROUND

In conventional automobiles, drivers observe when vehicle lights are not operating properly. Driverless AVs do not have drivers to observe the operation of lights on the AVs. Instead, in current fleet management systems for driverless AVs, manual inspections are performed to assess the functionality of vehicle lights. For example, a person inspects vehicles in the fleet at a storage facility or maintenance facility on a periodic basis (e.g., each morning, or once a week), including whether each vehicle's lights are operating properly. This manual inspection process can be time consuming and inefficient.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1 is a block diagram illustrating a system including an example AV in which automated inspection of AV lights according to some embodiments of the present disclosure may be implemented;

FIG. 2 is a block diagram illustrating a light inspection system according to some embodiments of the present disclosure;

FIG. 3 is a block diagram illustrating a vehicle management system according to some embodiments of the present disclosure;

DESCRIPTION OF EXAMPLE EMBODIMENTS OF THE DISCLOSURE

Overview

Figure 4:
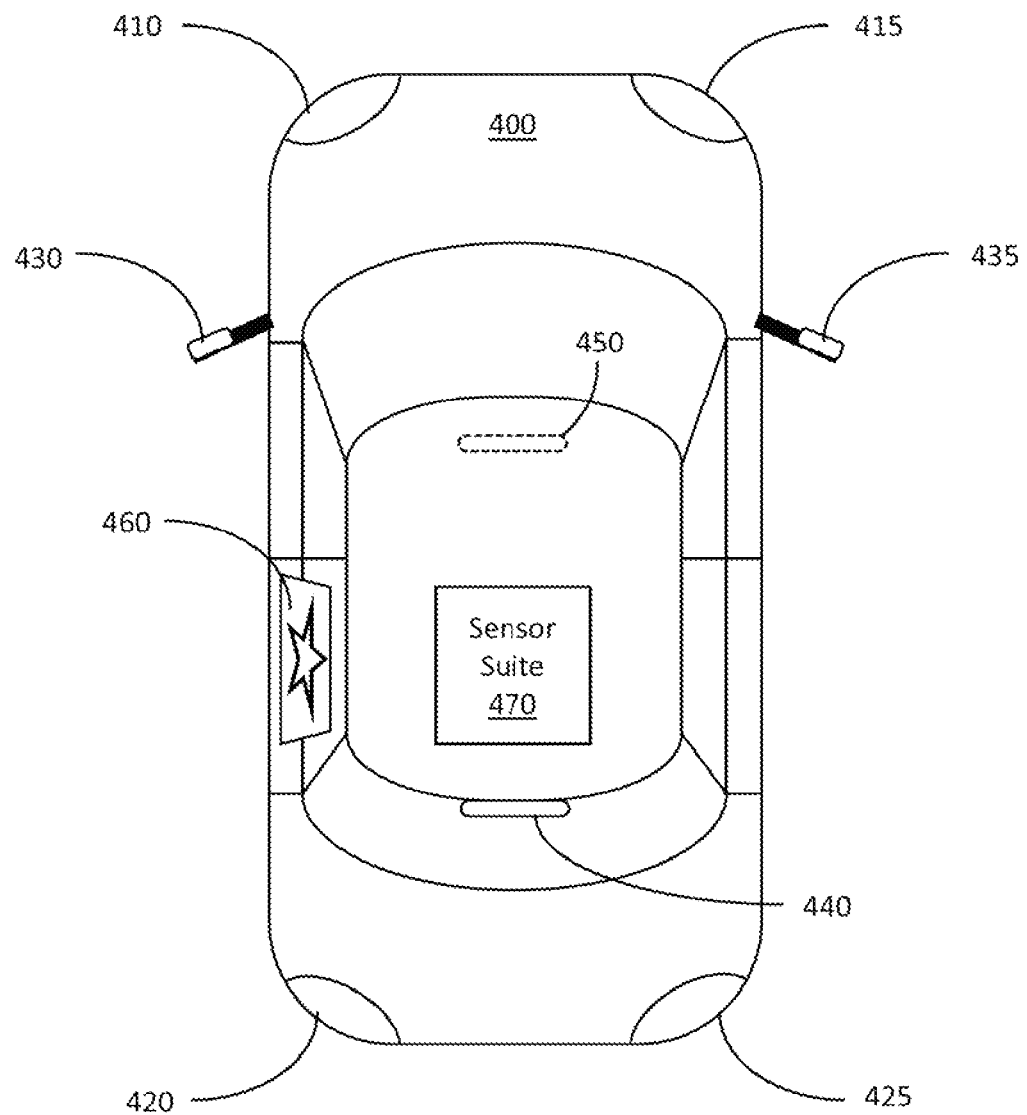
FIG. 4 is an example top view of an AV showing various lights of the AV according to some embodiments of the present disclosure.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Fleets of conventional vehicles often rely on human drivers to ensure that the vehicle lights are operating properly. Alternatively, fleets of conventional or autonomous vehicles use routine manual inspection of the vehicles to verify proper operation of the vehicle lights. For example, before vehicles are put into service for the day, a human inspector checks the exterior lights and interior lights of the vehicles to ensure that each light on each vehicle is operating correctly. Some vehicle lights, such as brake lights, are equipped with sensors that indicate when the lights are out; other vehicle lights do not have such sensors, and the human driver or human inspector observes the functioning of the lights in operation. Furthermore, even if a sensor indicates that a light is operational, the light may be obstructed by dirt or other material. Assessing vehicle lights using these routines is an inefficient process that may remove vehicles from service for a lengthy period of time. Reducing the frequency of inspection improves efficiency across the fleet, but it increases the likelihood that vehicles in the fleet are on the road with inoperable lights. In addition, certain conditions that impact the functionality of the lights, such as dirt or misalignment, may be difficult for a human inspector to detect.

The light inspection system described herein performs automatic inspection of vehicle lights, such as lights of an AV. The light inspection system instructs a camera to capture an image of the AV that includes one or more AV lights, such as headlights, fog lights, high beams, running lights, brake lights, tail lights, license plate lights, external displays, interior lights, etc. The light inspection system positions the AV relative to the camera such that the AV light is within a field of view of the camera. In one embodiment, the camera is mounted on a second AV as part of the second AV's sensor suite, and the first AV and/or second AV move relative to each other so that the second AV's camera captures the light of the first AV. In a second embodiment, the camera is located on the AV, and the AV maneuvers itself relative to a mirror that reflects an image of a portion of the AV to the camera. In a third embodiment, the camera is located within an AV facility, e.g., at a station for servicing, refueling, or storing AVs, and the AV autonomously maneuvers itself so that the light is visible to the camera.

When the AV has been positioned so that the camera can capture the AV's light, the AV switches the light on, and the camera captures an image of the light. The light inspection system receives the image from the camera and determines a luminance of the light based on the image. The light inspection system determines whether to service the light in response to the luminance being below a threshold, e.g., a threshold indicating that the light may be burned out, dirty, or otherwise not properly operating.

Embodiments of the present disclosure provide a system for inspecting a light of an AV. The system includes a camera interface, a positioning module, a light interface, and an image analyzer. The camera interface is configured to instruct a camera to capture an image of a field of view of the camera. The positioning module is configured to provide instructions to position the AV relative to the camera such that a light of the AV is within the field of view of the camera. The light interface is configured to instruct the light of the AV to switch on. The image analyzer is configured to receive an image captured by the camera, the image comprising the switched-on light of the AV, determine a luminance of the light of the AV based on the image, and determine to service the light of the AV in response to determining that the luminance of the light of the AV is below a threshold luminance.

Embodiments of the present disclosure also provide for a method for inspecting a light of an AV, and a computer-readable medium comprising instructions for performing the method. The method includes providing instructions to position the AV relative to a camera such that a light of the AV is within the field of view of the camera, instructing the light of the AV to switch on, instructing the camera to capture an image of the field of view, the image comprising the switched-on light of the AV, determining a luminance of the light of the AV based on the image, and determining to service the light of the AV in response to determining that the luminance of the light of the AV is below a threshold luminance.

As will be appreciated by one skilled in the art, aspects of the present disclosure, in particular aspects of automated light inspection for autonomous vehicles, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example AV Configured for Automated Inspection of Lights

FIG. 1 is a block diagram illustrating a system 100 including an example AV in which automated inspection of AV lights according to some embodiments of the present disclosure may be implemented. The system 100 includes a fleet of autonomous vehicles (AVs) 110, including AV 110*a*, AV 110*b*, and AV 110N, and a vehicle management system 120. For example, a fleet of AVs may include a number N of AVs, e.g., AV 110*a* through AV 110N. AV 110*a* includes a sensor suite 140 and a light inspection system 150. AVs 110*b* through 110N also include the sensor suite 140 and the light inspection system 150. A single AV in the fleet is referred to herein as AV 110, and the fleet of AVs is referred to collectively as AVs 110. The light inspection system 150 enables an AV 110 to automatically inspect the lights of the AV 110 (e.g., AV 110*a*) and/or another one of the AVs (e.g., AV 110*b*) to determine if any of the lights need servicing, e.g., replacement, adjustment, or cleaning. The vehicle management system 120 may automatically schedule inspection and servicing of the lights of the AVs 110.

Each AV 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions; e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the AV 110.

An onboard computer (not shown in FIG. 1) is connected to the sensor suite 140 and functions to control the AV 110 and to process sensed data from the sensor suite 140 and/or other sensors in order to determine the state of the AV 110. Based upon the vehicle state and programmed instructions, the onboard computer modifies or controls behavior of the AV 110. The onboard computer is preferably a general-purpose computer adapted for I/O communication with vehicle control systems and sensor suite 140, but may additionally or alternatively be any suitable computing device. The onboard computer is preferably connected to the Internet via a wireless connection (e.g., via a cellular data connection). Additionally or alternatively, the onboard computer may be coupled to any number of wireless or wired communication systems.

The AV 110 has various internal and external lights. For example, the AV 110 has one or more of headlights, fog lights, high beams, running lights, brake lights, tail lights, license plate lights, external displays, interior lights, etc. FIG. 4 shows a set of lights of an example AV.

The light inspection system 150 inspects the lights of an AV 110 in the fleet. The light inspection system 150 obtains one or more images of one or more lights of an AV 110, determines the luminance of the lights based on the image, and determines whether the luminance indicates whether any of the lights need servicing, e.g., if a light has a lower luminance than expected, or if the light is not visible in the image. The light inspection system 150 receives the image from a camera, e.g., a camera of the sensor suite 140 of the same AV 110, a camera of the sensor suite 140 of a different AV, or a camera mounted in an AV facility. While the light inspection system 150 is shown as a component of the AV 110, in some embodiments, some or all components of the light inspection system 150 are implemented outside of the AV 110, e.g., in the vehicle management system 120, at a cloud server, in an AV facility, etc. The light inspection system 150 is described further in relation to FIG. 2.

The vehicle management system 120 manages the fleet of AVs 110. The vehicle management system 120 may manage a service that provides or uses the AVs 110, e.g., a service for providing rides to users using the AVs 110, or a service that delivers items using AVs (e.g., prepared foods, groceries, packages, etc.). The vehicle management system 120 may select an AV from a fleet of AVs to perform a particular service or other task, and instruct the selected AV (e.g., AV 110a) to drive to a particular location (e.g., a delivery address). The vehicle management system 120 also manages fleet maintenance tasks, such as fueling, inspecting, and servicing of the AVs 110. As shown in FIG. 1, each of the AVs 110 communicates with the vehicle management system 120. The AVs 110 and vehicle management system 120 may connect over a public network, such as the Internet. The vehicle management system 120 is described further in relation to FIG. 3.

Example Light Inspection System

FIG. 2 is a block diagram illustrating the light inspection system 150 according to some embodiments of the present disclosure. The light inspection system 150 includes a positioning module 210, a light interface 220, a camera interface 230, an image analyzer 240, a communications interface 250, a lidar interface 260, and an ambient light interface 270. In alternative configurations, fewer, different and/or additional components may be included in the light inspection system 150. For example, in some configurations, the lidar interface 260 and/or ambient light interface 270 is not included. Further, functionality attributed to one component of the light inspection system 150 may be accomplished by a different component included in the light inspection system 150 or a different system than those illustrated. For example, in some embodiments, some elements of the light inspection system 150 may be implemented by a different AV, by a computer in an AV facility, by the vehicle management system 120, or by another server.

The positioning module 210 provides instructions to position the AV 110 relative to a camera that captures images of the AV 110 such that the field of view of the camera includes a particular light or set of lights of the AV 110. The positioning module 210 receives information describing the position of the AV 110 and/or information describing the location and field of view of the camera, and, based on this information, determines a maneuver or set of maneuvers to be performed so that the camera captures the lights of the AV 110. The instructions may include maneuvers to be performed by the AV 110 being inspected, maneuvers to be performed by the camera capturing images of the AV 110 (e.g., maneuvers by a movable camera mounting, or maneuvers by a second AV having a camera used to capture images of the AV 110 being inspected), or maneuvers to be performed by both the AV 110 and the camera. Three examples of positioning an AV 110 relative to a camera are described with respect to FIGS. 5-7.

In some embodiments, the positioning module 210 determines a sequence of maneuvers so that the camera can capture the AV 110 from multiple angles, e.g., to capture different lights of the AV 110 and/or to capture lights of the AV 110 from different angles. In such embodiments, the positioning module 210 provides instructions to re-position the AV relative to the camera. For example, the positioning module 210 provides instructions to position the AV 110 and/or camera so that the camera captures a first set of lights, visible from the front of the AV 110 (e.g., headlights and fog lights), and then provides instructions to re-position the AV 110 and/or camera so that the camera captures a second set of lights, visible from the back of the AV 110 (e.g., taillights and brake lights).

The light interface 220 interfaces with the lights of the AV 110. The light interface 220 instructs one or more lights of the AV 110 to switch on so that images of the lights in operation may be captured by the camera. The light interface 220 may instruct the lights of the AV 110 to switch on and off in a sequence that allows the camera to capture images from each of a set of lights. For example, the light interface 220 may instruct various lights of a headlight assembly to turn on and off in a sequence that allows each light to be independently captured and analyzed, e.g., first turning on headlights, then turning off the headlights and turning on running lights, then turning off the running lights and turning on high beams, etc. The light interface 220 receives information from the positioning module 210 indicating lights that are in the field of view of the camera, and instructs one or more lights within the field of view of the camera to turn on. For example, if the positioning module 210 indicates that the AV 110 is positioned so that the camera's field of view includes the back of the AV 110, the light interface 220 instructs lights visible from the back of the AV 110 (e.g., taillights and brake lights) to switch on. When the AV 110 is re-positioned, the light interface 220 instructs a different set of lights to switch on.

The camera interface 230 interfaces with the camera, e.g., one or more cameras of the AV 110 being inspected, one or more cameras of a different AV, or one or more cameras in an AV facility. The camera interface 230 instructs the camera to capture an image of the field of view of the camera when the AV 110 is positioned in the field of view of the camera. The camera interface 230 receives information from the light interface 220 indicating when a light or set of lights has been switched on, and the camera interface 230 instructs the camera to capture the image of the AV 110 while the light(s) are on. The camera interface 230 may instruct the camera to capture still images, videos, or a combination of images and videos. For example, the camera interface 230 instructs the camera to capture videos for lights that flash or otherwise vary over time, such as turn indicators or hazard lights, and the camera interface 230 instructs the camera to capture still images for lights that do not vary over time, such as headlights and taillights.

The image analyzer 240 receives images captured by the camera and analyzes the images to determine the luminance of the lights of the AV 110. The image analyzer 240 compares the luminance of the lights to one or more thresholds (e.g., a threshold associated with each light) and, if any of the luminances are below their associated thresholds, determines if any of the lights of the AV 110 should be serviced.

To determine a luminance measurement of a particular light of the AV 110, the image analyzer 240 identifies the location of the light in the captured image. For example, based on the relative position of the AV 110 and the camera, the image analyzer 240 expects the light to be at a particular position (e.g., a particular set of pixels) in the image. Alternatively, the image analyzer 240 may detect the AV 110 in the image and determine the location of the light on the detected AV 110. After identifying the location of the light in the image, the image analyzer 240 analyzes the color of the light, the apparent size of the light, the brightness of the light, the color and/or brightness of other portions of the image, and/or other aspects of the image to determine the luminance of the light. For example, the image analyzer 240 compares the color and brightness of the light to color and brightness of one or more other portions of the image to determine a luminance measurement.

The image analyzer 240 may have different thresholds for different types of lights, e.g., a higher threshold for a high-beam light than for a headlight, and a lower threshold for a running light than a headlight. The image analyzer 240 may have multiple thresholds describing different light conditions, e.g., a first threshold over which the light is categorized as clean and properly operating, and a second, lower threshold that is a minimum operating threshold, below which the light is categorized as off or burned out. As another example, the image analyzer 240 identifies lights with a luminance in a range between the first and second threshold, or within a smaller range, the range indicating that the light has a lower luminance than desired (e.g., somewhat dirty) but is still operational. The image analyzer 240 may have different thresholds indicating the level of urgency for servicing the light (e.g., service immediately, service in the next 5 days, service when the AV 110 returns to an AV facility for fueling or storage, etc.). The urgency may also depend on the type of light (e.g., brake light servicing may be more urgent than running light servicing).

In some embodiments, the image analyzer 240 determines the luminance of the light by comparing the image of the AV 110 to one or more other reference images. For example, the image analyzer 240 has a library of images showing AVs with lights in various conditions (e.g., working properly, off/burned out, various levels of dirt, various types of misalignment). The image analyzer 240 compares the image of the AV 110 to the reference image to determine the luminance of the light. For example, the image analyzer 240 determines which of the reference images the image of the light is most similar to, and if the selected reference image indicates that the luminance is below a threshold (e.g., misaligned beyond a given amount, or dirty beyond a given amount), the image analyzer 240 determines to service the AV 110.

The communications interface 250 enables the light inspection system 150 to communicate with other systems or servers. For example, if the light inspection system 150 is implemented in the AV 110, the communications interface 250 communicates with the vehicle management system 120, e.g., to receive instructions from the vehicle management system 120 to inspect the lights of the AV 110, and to inform the vehicle management system 120 that the AV 110 needs servicing. As another example, if the light inspection system 150 cooperates with another AV or cameras within an AV facility, the communications interface 250 communicates with the other AV or AV facility, e.g., to send instructions from the camera interface 230.

The lidar interface 260 interfaces with a lidar (light detection and ranging) sensor in the sensor suite 140. The lidar sensor measures distances to objects in the vicinity of the AV 110 using reflected laser light. The lidar sensor may be a scanning lidar that captures a point cloud of the environment of the AV 110. The image analyzer 240 or another processor (e.g., the onboard computer) may receive the point cloud, analyze the data to identify the position of the camera in the point cloud, and determine a distance between the AV 110 and the camera based on the point cloud data.

The distance from the AV 110 to the camera may be used for positioning and/or for determining luminance of the lights. In some embodiments, the positioning module 210 receives data describing the location of the camera (e.g., the distance between the AV 110 and the camera and/or the position of the camera relative to the AV 110) from the image analyzer 240, and the positioning module 210 uses this data to position the AV 110 relative to the camera. For example, the positioning module 210 instructs the AV 110 to perform a positioning maneuver to alter the position of the AV 110 relative to the camera based on the distance between the AV 110 and the camera, e.g., to move closer the camera or farther away from the camera. In some embodiments, the image analyzer 240 determines the luminance of the light based on the distance between the AV 110 and the camera. For example, the image analyzer 240 scales the luminance based on the distance, scaling down the luminance when the camera is closer to the AV 110, and scaling up the luminance when the camera is farther from the AV 110, because the distance alters the apparent brightness of the light in the image.

The ambient light interface 270 interfaces with an ambient light sensor in the AV 110, e.g., in the sensor suite 140. The ambient light sensor measures the amount of ambient light in the environment of the AV 110. The image analyzer 240 may determine the luminance of the light based on the level of ambient light in the environment of the AV 110. For example, if the image analyzer 240 determines the luminance by comparing the apparent brightness of the light to the apparent brightness of other areas of the image, the image analyzer 240 may scale the luminance based on the ambient light level, e.g., increasing the brightness when the ambient light level is high. As another example, if the image analyzer 240 compares the image of the AV 110 to reference images to determine the luminance of the light, the image analyzer 240 may select a subset of the reference images that were taken with a similar level of ambient light to the ambient light level received at the ambient light interface 270.

Example Vehicle Management System

FIG. 3 is a block diagram illustrating the vehicle management system 120 according to some embodiments of the present disclosure. The vehicle management system 120 includes a UI (user interface) server 310, a vehicle manager 320, and a maintenance scheduler 330. In alternative configurations, different and/or additional components may be included in the vehicle management system 120. Further, functionality attributed to one component of the vehicle management system 120 may be accomplished by a different component included in the vehicle management system 120 or a different system than those illustrated.

The UI server 310 is configured to communicate with client devices that provide a user interface to users. For example, the UI server 310 may be a web server that provides a browser-based application to client devices, or the UI server 310 may be a mobile app server that interfaces with a mobile app installed on client devices. The user interface enables the user to access a service of the vehicle management system 120, e.g., to request a ride from an AV 110, or to request a delivery from an AV 110.

Figure 5:
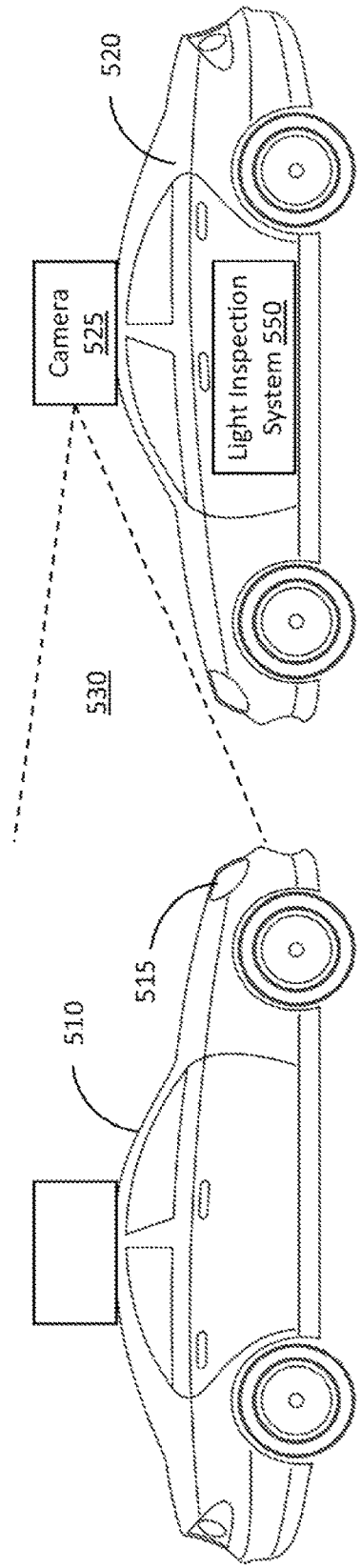
FIG. 5 illustrates an example use case of the lights of a first AV being inspected by a second AV according to some embodiments of the present disclosure.

The vehicle manager 320 manages and communicates with a fleet of AVs, including AVs 110a through 110N. The vehicle manager 320 may assign AVs 110 to various tasks and direct the movements of the AVs 110 in the fleet. For example, the vehicle manager 320 assigns an AV 110 to perform a service requested by a user to the UI server 310. The vehicle manager 320 may instruct AVs 110 to drive to other locations while not servicing a user, e.g., to improve geographic distribution of the fleet, to anticipate demand at particular locations, etc. The vehicle manager 320 also instructs AVs 110 to return to AV facilities for fueling, inspection, maintenance, or storage. The vehicle manager 320 may instruct an AV 110 to receive an inspection at a maintenance facility, including an inspection of vehicle lights. In some embodiments, the vehicle manager 320 instructs an AV 110 to perform an inspection of another AV 110; and example of this is shown in FIG. 5.

The maintenance scheduler 330 schedules maintenance of the AV 110. For example, the maintenance scheduler 330 may schedule time-based or mileage-based servicing. The maintenance scheduler also schedules need-based services, including services to replace, adjust, or clean vehicle lights. In particular, the maintenance scheduler receives a signal from the light inspection system 150 indicating that the luminance of a light of the AV 110 is below a threshold luminance that indicates servicing is needed. The maintenance scheduler 330 schedules the AV 110 for servicing and instructs the AV to maneuver to a maintenance facility for servicing of the light of the AV. The maintenance scheduler 330 may instruct the AV 110 to drive to a maintenance facility, or to drive to a particular part of the maintenance facility of the AV 110 is already in the facility for the inspection. The maintenance scheduler 330 may instruct the AV 110 to drive to the maintenance facility immediately (e.g., if the AV 110 is not safe to be servicing users, or if the AV 110 can be serviced quickly), or the maintenance scheduler 330 may instruct the AV 110 to drive to the maintenance facility at a particular time. The maintenance scheduler 330 may automatically request parts to be at the maintenance facility for servicing the AV 110. For example, the maintenance scheduler 330 determines a part used for servicing the AV 110 (e.g., a light that needs replacing, or parts used for re-aligning the light), and the maintenance scheduler 330 submits a request for the part to be delivered to the maintenance facility for servicing the light of the AV 110. The maintenance scheduler 330 may submit the request to a parts warehouse, a parts supplier, or another source of parts.

Example AV Lights

FIG. 4 is an example top view of an AV 400 showing various lights of the AV according to some embodiments of the present disclosure. The light inspection system 150 can be used to inspect any of the lights shown in FIG. 4. The AV 400 includes a left headlight assembly 410 and a right headlight assembly 415. Each headlight assembly 410 and 415 may include, for example, a headlight, a running light, a fog light, a high beam, and a turn indicator. In some embodiments, one or more of these lights may be in a separate assembly, e.g., the fog lights may be below the headlight assembly. The AV 400 includes a left taillight assembly 420 and a right taillight assembly 425. Each taillight assembly 420 and 425 may include, for example, a running light, a brake light, and a turn indicator. The AV 400 has left turn indicator 430 and right turn indicator 435 on the side mirrors, in addition to in the turn indicators in the headlight assemblies 410 and 415 and the taillight assemblies 420 and 425. The AV 400 has an additional brake light 440 in the center of the rear window. The AV 400 has an interior light 450, located below the roof. The interior light 450 is not visible from above, but the interior light 450, or light from the interior light 450, is visible through the windows of the AV 400, e.g., through the left side windows, right side windows, and/or windshield of the AV 400. If light from the interior light 450 is visible from outside the AV 400, the interior light 450 can be inspected by the light inspection system 150. The AV 400 may have additional interior lights not shown in FIG. 4 that can also be inspected by the light inspection system 150. The AV 400 has an exterior display screen 460, which may display information to users of the AV service, such as information for users to identify their assigned AV, or other information. The AV 400 may have additional display screens, e.g., another display screen on the right side. The light inspection system 150 may be used to inspect the functionality of the display screen 460 or any other display screens. The AV 400 also includes a sensor suite 470, which is similar to the sensor suite 140 described above.

Example Use Cases for Light Inspection System

FIG. 5 illustrates an example use case of the lights of a first AV being inspected by a second AV according to some embodiments of the present disclosure. In this example, a first AV 510 is being inspected by a second AV 520. A camera 525 mounted on the second AV 520 has a field of view 530 that includes the front of the first AV 510, including a headlight assembly 515. The camera 525 may be a component of a sensor suite, such as sensor suite 140, of the second AV 520. In this example, the second AV 520 has a light inspection system 550, which is similar to the light inspection system 150 described above, for inspecting the lights of the first AV 510. In other embodiments, the light inspection system 550 is implemented in the first AV 510, by the vehicle management system 120, or by one or more other devices that receive images from the camera 525.

In this use case, the positioning module 210 instructs the first AV 510 and/or the second AV 520 to maneuver relative to each other so that the field of view 530 includes lights of the first AV 510. For example, the positioning module 210 determines a location of the first AV 510 relative to the second AV 520, and instructs the first AV 510 to perform at least one positioning maneuver such that a light of the first AV 510 (e.g., the headlight assembly 515) is within the field of view 530 of the camera 525. Alternatively, the positioning module 210 determines a location of the second AV 520 relative to the first AV 510, and instructs the second AV 520 to perform at least one positioning maneuver such that the field of view 530 of the camera 525 mounted on the second AV 520 is positioned to capture a light of the first AV 510 (e.g., the headlight assembly 515).

Figure 6:
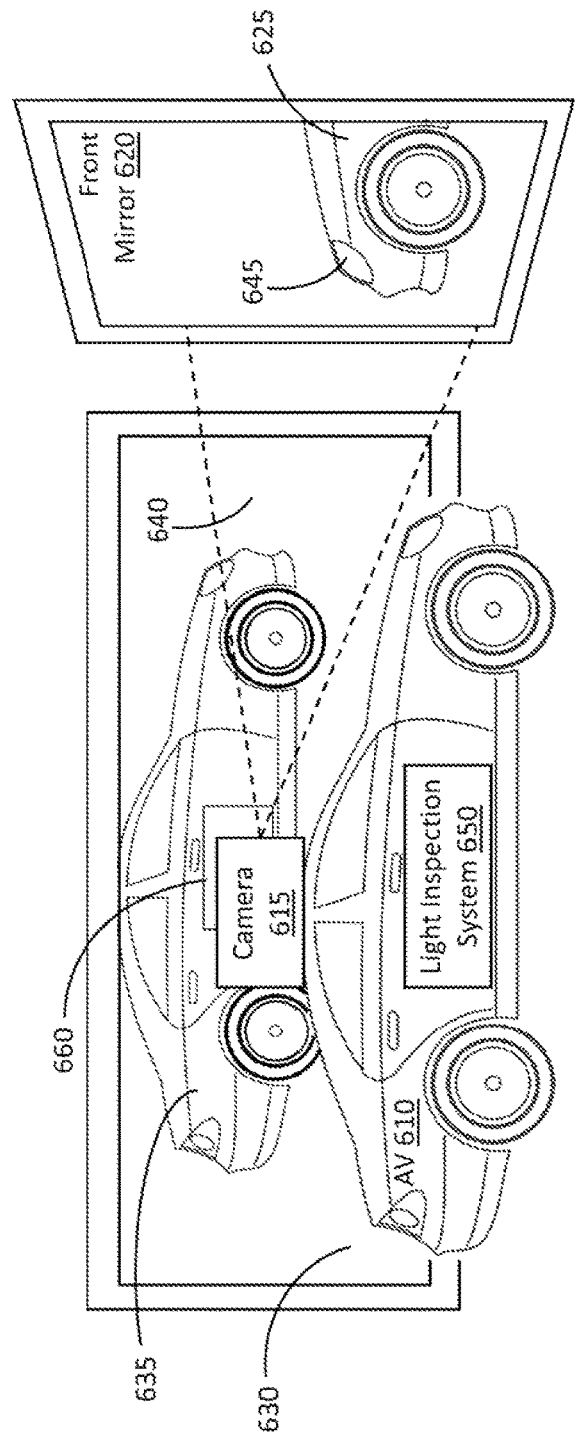
FIG. 6 illustrates an example use case of an AV performing an inspection of its own lights according to some embodiments of the present disclosure.

FIG. 6 illustrates an example use case of an AV performing an inspection of its own lights according to some embodiments of the present disclosure. In this example, an AV 610 is positioned near a mirror arrangement that includes a front mirror 620 and a side mirror 630. The front mirror 620 and side mirror 630 provide reflections of the AV 610. The camera 615 is mounted on the AV 610, and may be a component of a sensor suite, such as sensor suite 140. The light inspection system 650, which is similar to the light inspection system 150 described above, inspects the lights of the AV 610 based on images received from the camera 615.

The front mirror 620 provides a front reflection 625 in the field of view 640 of the camera 615. The front reflection 625 captured in the field of view 640 includes the front of the AV 610, including a headlight assembly 645. The side mirror 630 provides a side reflection 635 in a second field of view (not shown in FIG. 4) of the camera 615, or in a field of view of a second camera (not shown in FIG. 4). The side reflection 635, which is captured in a field of view of the camera 615 or a second camera, shows the left side of the AV 610, including a display screen 660. In other embodiments, different mirror arrangements from the arrangement shown in FIG. 6 may be used. For example, a single mirror may be used, or the AV 610 may enter a room with a mirror on each wall.

In this use case, the positioning module 210 maneuvers the AV 610 so that the AV 610 is reflected by the front mirror 620 and side mirror 630, and the camera(s) of the AV 610 (e.g., camera 615) capture the reflections of the AV 610. For example, the positioning module 210 determines a location of the AV 610 relative to the mirror 620, and instructs the AV 610 to perform at least one positioning maneuver such that the field of view of the camera 615 is positioned to capture a reflection of the light of the AV 610 (e.g., the headlight assembly 645) in the mirror. The mirror arrangement may be located within an AV facility, e.g., a facility for maintenance or storage.

Figure 7:
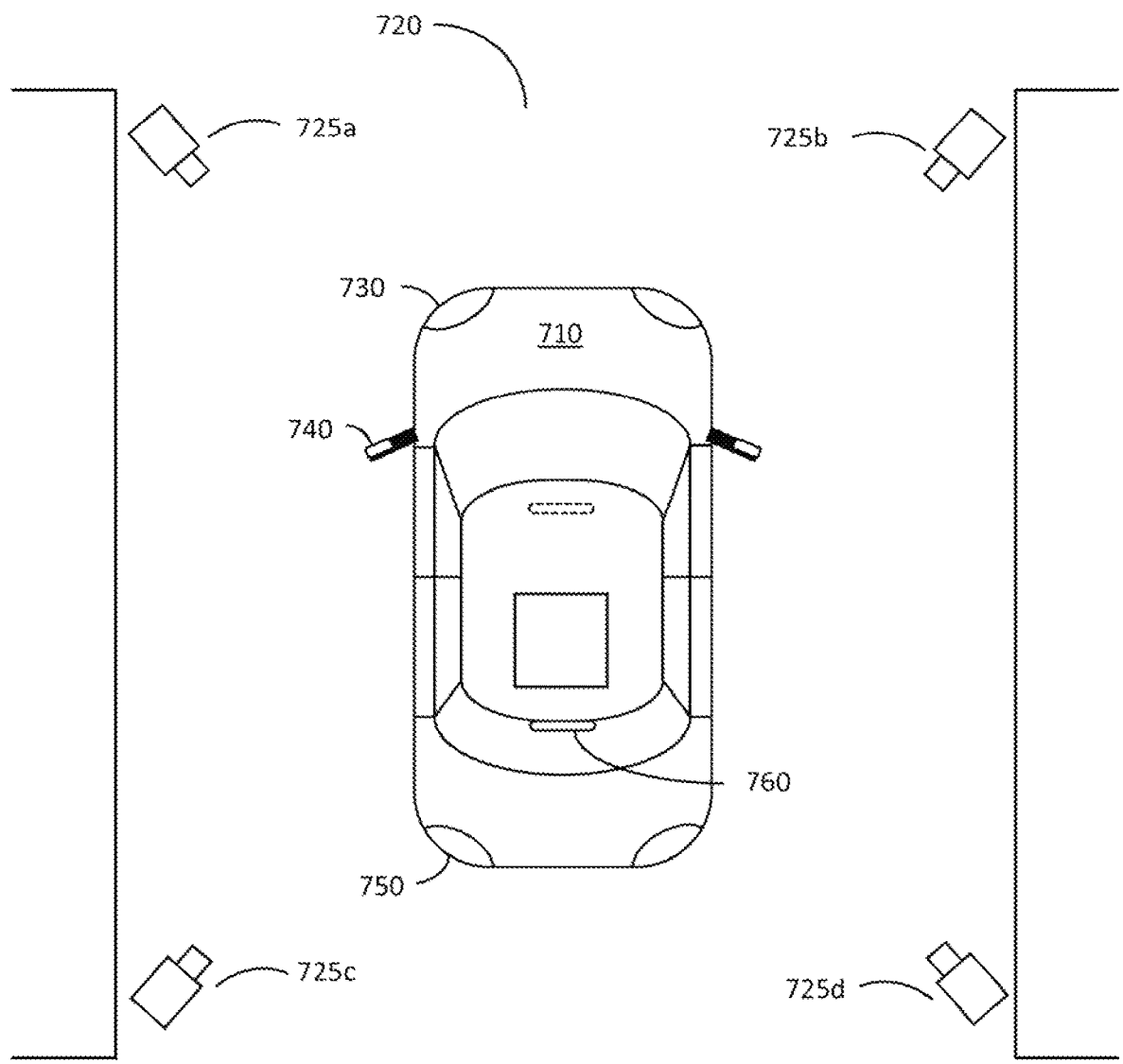
FIG. 7 illustrates an example use case of an AV facility performing an inspection of lights of an AV according to some embodiments of the present disclosure.

FIG. 7 illustrates an example use case of an AV facility performing an inspection of lights of an AV according to some embodiments of the present disclosure. In this use case, an AV facility, such as a facility for performing maintenance on AVs, storing AVs, or refueling AVs, has a light inspection station 720. In some embodiments, the light inspection station 720 is configured to inspect additional aspects of AVs, such as the body or sensor systems. In some embodiments, the light inspection station 720 performs other tasks, such as AV storage or fueling. For example, each parking spot within an AV facility may be a light inspection station 720.

An AV 710 is positioned in the light inspection station 720, which includes four cameras 725a, 725b, 725c, and 725d, referred to collectively as cameras 725. The cameras 725 may be mounted on walls of the light inspection station 720, a ceiling or floor of the AV facility, or on other equipment in the AV facility, etc. The cameras 725 are arranged to capture images of the AV 710 from various angles. For example, camera 725a captures an image including the left headlight assembly 730 and the left turn indicator 740. Camera 725c captures an image including the left taillight assembly 750. Both cameras 725c and 725d may capture images including the brake light 760. In other examples, more or fewer cameras 725 are included, and the cameras 725 may be at different locations from those shown in FIG. 7. The cameras 725 communicate with a light inspection system, such as light inspection system 150, which may be implemented in the AV 710, the light inspection station 720, a computer elsewhere in the AV facility, or an off-site computer. The light inspection system instructs the cameras 725 to capture images of the AV 710 and analyzes the captured images to determine if any of the lights of the AV 710 need servicing.

The light inspection station 720 is configured so that the AV 710 can autonomously maneuver itself into the light inspection station 720 and into a position in which the AV lights, such as the lights 730-760, are in the field of view of at least one of the cameras 725. The light inspection station 720 may include reference information, such as walls, markings on walls or the floor, or objects in or around the light inspection station 720, and the positioning module 210 can generate instructions for the AV 710 to perform maneuvers to position the AV 710 in the light inspection station 720 based on the reference information. For example, the AV 710 autonomously maneuvers itself to a position equidistant between two walls on which the cameras 725 are mounted, and 2 meters behind a paint marking (not shown in FIG. 7) on the floor of the light inspection station 720.

In some embodiments, after the cameras 725 have taken images of the lights of the AV 710, the positioning module 210 repositions the AV 710 so that the cameras 725 can capture additional images of the AV 710 from different angles. In some embodiments, the cameras 725 are fixed to a movable camera mounting that enables the camera interface 230 to adjust the camera positions and/or field of views. In some embodiments, the camera interface 230 instructs the cameras 725 to move to a particular position based on the model of AV 710. In some embodiments, the camera interface 230 instructs the cameras 725 to move to a series of positions and capture a series of images to capture different field of views of the AV 710.

Figure 8:
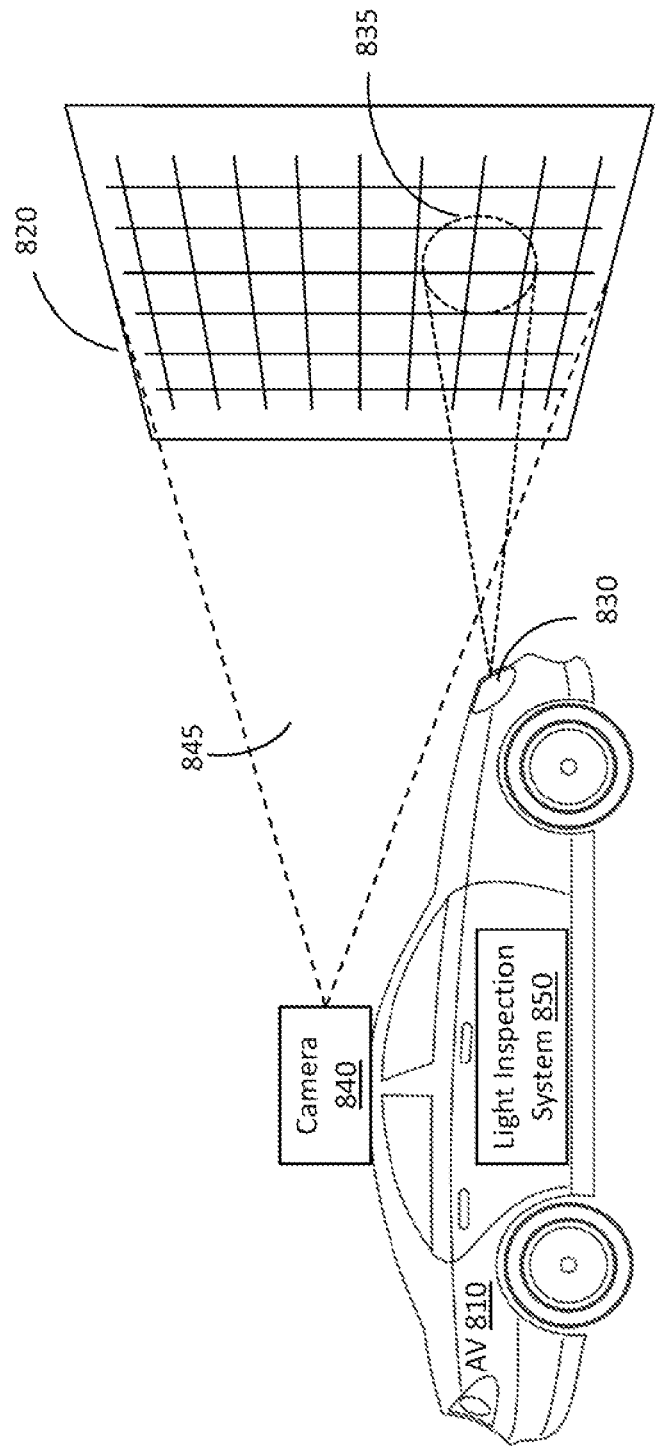
FIG. 8 illustrates an example use case of an AV positioned to direct a light onto a patterned surface to analyze alignment of the light according to some embodiments of the present disclosure.

FIG. 8 illustrates an example use case of an AV positioned to direct a light onto a patterned surface to analyze alignment of the light according to some embodiments of the present disclosure. The AV 810 is positioned in front of a patterned wall 820, which may be a wall in an AV facility. As shown in FIG. 8, the patterned wall 820 has grid lines across the wall; in other embodiments, other patterns may be used. A headlight 830 of the AV 810 directs a light beam at the patterned wall 820, and a headlight focus region 835 is shown on the grid of the patterned wall 820. The headlight focus region 835 may be a region in which the luminance of the light emitted from the headlight 830 and incident on the patterned wall 820 is above a threshold luminance.

A camera 840 has a field of view 845 that captures the patterned wall 820, including the headlight focus region 835. An image analyzer 240 of a light inspection system 850, which is similar to light inspection system 150 described above, receives an image captured by the camera 840. The image analyzer 240 determines the focus position of the headlight, e.g., the location of the center of the headlight focus region 835 within the grid pattern, or the boundaries of the headlight focus region 835. The light inspection system 850 determines whether the headlight 830 is misaligned based on the determined focus position. For example, when the AV 810 has maneuvered to a particular position relative to the patterned wall 820, the headlight focus region 835 is expected to be at a particular position on the patterned wall 820 when the headlight 830 is properly aligned. If the light inspection system 850 determines that the focus position of the headlight 830 is shifted away from this expected position, the light inspection system 850 determines that the headlight 830 is misaligned. The light inspection system 850 can further determine the direction and degree of misalignment.

While the use case shown in FIG. 8 analyzes the alignment of the headlight 830, in other use cases, the light inspection system 850 can use the patterned wall 820 to assess alignment of other lights, such as high beams, fog lights, tail lights, etc., in a similar manner. While FIG. 8 shows the camera 840 as a camera mounted on the AV 810, and the light inspection system 850 as being implemented by the AV 810, in other embodiments, either or both of the camera 840 and light inspection system 850 are implemented outside the AV 810, e.g., by another AV, or by the AV facility.

Example Method for Inspecting Lights of an AV

Figure 9:
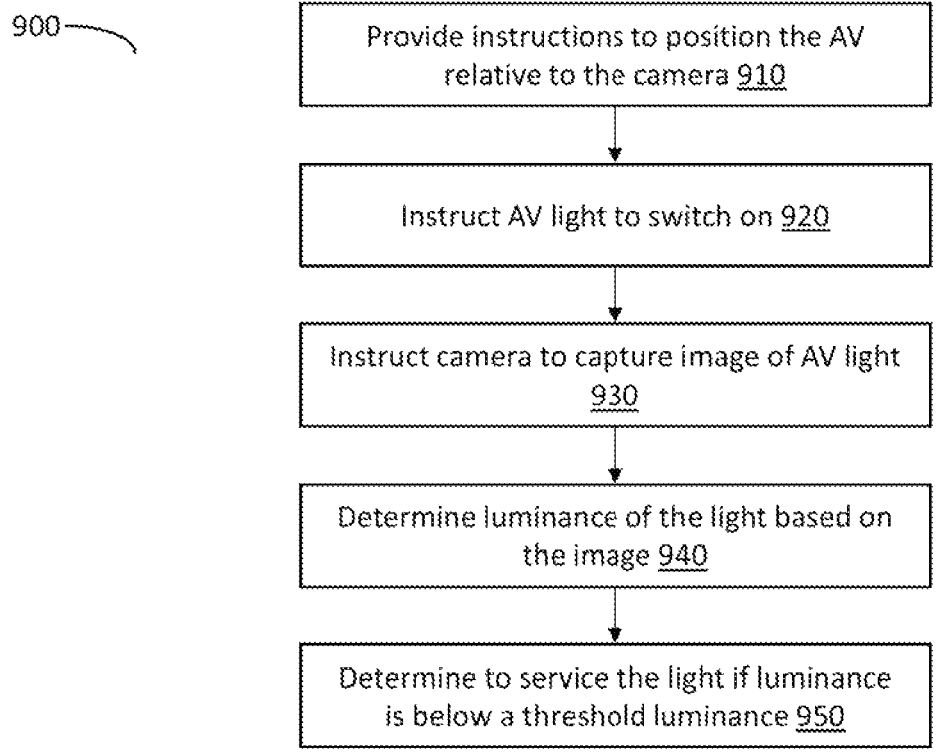
FIG. 9 is a flowchart of an example method for inspecting lights of an AV according to some embodiments of the present disclosure.

FIG. 9 is a flowchart of an example method for inspecting lights of an AV according to some embodiments of the present disclosure. A light inspection system 150 provides 910 instructions to position the AV relative to the camera. For example, the positioning module 210 provides instructions to the AV 110 to perform maneuvers so that one or more lights of the AV 110 are within a field of view of the camera. The camera may be mounted in an AV facility. Alternatively, the camera may be mounted on AV 110, which maneuvers near a mirror that reflects an image of the AV 110 to the camera. As another example, the positioning module 210 provides instructions to a second AV to perform maneuvers so that lights of the AV 110 are within the field of view of a camera mounted on the second AV.

The light inspection system 150 (e.g., the light interface 220) instructs 920 the light of the AV to switch on. The light inspection system 150 (e.g., the camera interface 230) instructs 930 the camera to capture an image of the light of the AV; the image includes the switched-on light of the AV. The light inspection system 150 (e.g., the image analyzer 240) determines 940 a luminance of the light of the AV based on the image. The light inspection system 150 (e.g., the image analyzer 240) determines to service the light in response to determining that the luminance of the light is below a threshold luminance.

Select Examples

Example 1 provides a system for inspecting a light of an AV including a camera interface configured to instruct a camera to capture an image of a field of view of the camera; a positioning module configured to provide instructions to position the AV relative to the camera such that a light of the AV is within the field of view of the camera; a light interface configured to instruct the light of the AV to switch on; and an image analyzer configured to receive an image captured by the camera, the image including the switched-on light of the AV, determine a luminance of the light of the AV based on the image, and determine to service the light of the AV in response to determining that the luminance of the light of the AV is below a threshold luminance.

Example 2 provides the system of according to example 1, where the camera is mounted on a second AV as a component of a sensor suite of the second AV.

Example 3 provides the system according to example 2, where the positioning module is configured to determine a location of the AV relative to the second AV, and instruct the AV to perform at least one positioning maneuver such that the light of the AV is within the field of view of the camera mounted on the second AV.

Example 4 provides the system according to example 2, where the positioning module is configured to determine a location of the second AV relative to the AV, and instruct the second AV to perform at least one positioning maneuver such that the field of view of the camera mounted on the second AV is positioned to capture the light of the AV.

Example 5 provides the system according to example 1, where the system further includes a mirror, the camera is mounted on the AV as a component of a sensor suite of the AV, and the positioning module is configured to determine a location of the AV relative to the mirror, and instruct the AV to perform at least one positioning maneuver such that the field of view of the camera mounted on the AV is positioned to capture a reflection of the light of the AV in the mirror.

Example 6 provides the system according to example 1, where the camera is mounted within a station within an AV facility, the station is configured to enable the AV to autonomously maneuver into the station, and the positioning module is configured to instruct the AV to perform at least one positioning maneuver to maneuver the AV into the station.

Example 7 provides the system according to any of the preceding examples, where the positioning module is further configured to provide instructions to re-position the AV relative to the camera such that a second light of the AV is within the field of view of the camera, and the image analyzer is further configured to receive a second image captured by the camera, the second image including the second light of the AV; determine a luminance of the second light of the AV based on the second image; and determine to service the second light of the AV in response to determining that the luminance of the second light of the AV is below a threshold luminance.

Example 8 provides the system according to any of the preceding examples, where the system further includes a lidar sensor configured to capture a point cloud describing the environment of the AV, and the image analyzer is further configured to determine a distance between the AV and the camera based on the point cloud.

Example 9 provides the system according to example 8, where the positioning module is configured to instruct the AV to perform at least one positioning maneuver to alter the position of the AV relative to the camera based on the distance between the AV and the camera.

Example 10 provides the system according to example 8 or 9, where the image analyzer is configured to determine the luminance of the light based on the distance between the AV and the camera.

Example 11 provides the system according to any of the preceding examples, where the threshold luminance is a first luminance threshold indicating proper operation of the light of the AV, image analyzer is further configured to compare the luminance of the light of the AV to a second luminance threshold lower than the first luminance threshold, and the luminance being lower than the second luminance threshold indicates that the light is off or burned out.

Example 12 provides the system according to any of the preceding examples, where the positioning module is further configured to provide instructions to position the AV such that the light of the AV is directed at a patterned surface, and the image analyzer is further configured to determine a focus position of the light of the AV on the patterned surface based on the image, and determine whether the light of the AV is misaligned based on the focus position.

Example 13 provides the system according to any of the preceding examples, where the system further includes an ambient light sensor configured to measure a level of ambient light in the environment of the AV, and the image analyzer is configured to determine the luminance of the light of the AV based on the level of ambient light in the environment of the AV.

Example 14 provides the system according to any of the preceding examples, where the system further includes a maintenance scheduler configured to instruct the AV to maneuver to a maintenance facility for servicing of the light of the AV in response to determining that the luminance of the light of the AV is below a threshold luminance.

Example 15 provides the system according example 14, where the maintenance scheduler is further configured to identify a part used for servicing the light of the AV, and submit a request for the part to be delivered to the maintenance facility for servicing the light of the AV.

Example 16 provides a method for inspecting a light of an AV, the method including providing instructions to position the AV relative to a camera such that a light of the AV is within the field of view of the camera; instructing the light of the AV to switch on; instructing the camera to capture an image of the field of view, the image including the switched-on light of the AV; determining a luminance of the light of the AV based on the image; and determining to service the light of the AV in response to determining that the luminance of the light of the AV is below a threshold luminance.

Example 17 provides the method according to example 16, where the camera is mounted on a second AV as a component of a sensor suite of the second AV, and the method further includes determining a location of the AV relative to the second AV; and in response to the instructions to position the AV relative to a camera, maneuvering at least one of the AV and the second AV such that the light of the AV is within the field of view of the camera mounted on the second AV.

Example 18 provides the method according to example 16, where the camera is mounted on the AV as a component of a sensor suite of the AV, and the method further includes determining a location of the AV relative to a mirror; and in response to the instructions to position the AV relative to a camera, maneuvering the AV such that the field of view of the camera mounted on the AV is positioned to capture a reflection of the light of the AV in the mirror.

Example 19 provides the method according to example 16, where the camera is mounted within a station within an AV facility, the station is configured to enable the AV to autonomously maneuver into the station, and the method further includes performing, by the AV, at least one positioning maneuver to maneuver the AV into the station in response to receiving the instructions to position the AV relative to a camera.

Example 20 provides a non-transitory computer-readable medium storing instructions for inspecting a light of an AV, the instructions, when executed by a processor, cause the processor to provide instructions to position the AV relative to a camera such that a light of the AV is within the field of view of the camera; instruct the light of the AV to switch on; instruct the camera to capture an image of the field of view, the image including the switched-on light of the AV; determine a luminance of the light of the AV based on the image; and determine to service the light of the AV in response to determining that the luminance of the light of the AV is below a threshold luminance.

Example 21 provides a system for inspecting a light of a first AV, the system including a camera mounted on a second AV, the camera configured to capture an image of a field of view; a positioning module configured to position the second AV relative to the first AV such that a light of the first AV is within the field of view of the camera; and an image analyzer configured to receive an image captured by the camera, the image comprising the light of the first AV, and to determine to service the light of the first AV based on the image.

Example 22 provides a method for inspecting a light of a first AV, the method including positioning a second AV relative to the first AV such that a light of the first AV is within a field of view of a camera mounted on the second AV; instructing the camera mounted on the second AV to capture an image of the field of view, the image comprising the light of the first AV; and determining to service the light of the first AV based on the captured image.

Example 23 provides system for inspecting a light of an AV, the system including a camera mounted on the AV and configured to capture an image of a field of view; a positioning module configured to position the AV relative to a mirror such that a light of the AV is reflected by the mirror to the field of view of the camera; a light interface configured to instruct the light of the AV to switch on; and an image analyzer configured to receive an image captured by the camera, the image comprising the light of the first AV, and to determine to service the light of the first AV based on the image.

Example 24 provides a method for inspecting a light of an AV, the method including positioning the AV relative to a mirror such that a light of the AV is reflected by the mirror and visible in a field of view of a camera mounted on the AV; instructing the light of the AV to switch on; capturing, by the camera mounted on the AV, an image of the field of view of the camera, the image comprising the light of the AV; and determining to service the light of the AV based on the captured image.

Example 25 provides a system for inspecting a light of an AV, the system including a camera mounted in an AV facility, the camera configured to capture an image of a field of view; a positioning module configured to autonomously maneuver the AV relative to the camera such that a light of the AV is within the field of view of the camera; and an image analyzer configured to receive an image captured by the camera, the image comprising the light of the first AV, and to determine to service the light of the first AV based on the image.

Example 26 provides a method for inspecting a light of an AV, the method including autonomously maneuvering the AV in an AV facility comprising a mounted camera such that a light of the AV is within a field of view of the camera; instructing the camera to capture an image of the field of view, the image comprising the light of the AV; and determining to service the light of the AV based on the captured image.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for inspecting a light of an autonomous vehicle (AV) comprising:
   providing instructions to position the AV such that the light of the AV is within a field of view of a camera;
   instructing the camera to capture an image of the field of view, the image comprising the light of the AV; and
   determining to service the light of the AV based on the captured image.

2. The method of claim 1, wherein the AV is a first AV, the camera is mounted on a second AV, the method further comprising:
   determining a location of the first AV relative to the second AV; and
   providing instructions to the first AV to position the first AV such that the light of the first AV is within the field of view of the camera mounted on the second AV.

3. The method of claim 1, wherein the camera is mounted on the AV, the method further comprising:
   determining a location of the AV relative to a mirror; and performing, by the AV, at least one positioning maneuver to maneuver the AV such that the field of view of the camera mounted on the AV is positioned to capture a reflection of the light of the AV in the mirror.

4. The method of claim 1, wherein the camera is mounted within a station within an AV facility, the method further comprising:
performing, by the AV, at least one positioning maneuver to maneuver the AV such that light of the AV is positioned within the field of view of the camera mounted in the station.

5. The method of claim 1, further comprising:
prior to instructing the camera to capture the image of the field of view, instructing the light of the AV to switch on.

6. The method of claim 1, wherein determining to service the light of the AV based on the captured image comprises:
determining a luminance of the light of the AV based on the captured image; and
determining that the luminance of the light of the AV is below a threshold luminance.

7. The method of claim 1, further comprising receiving a measurement of a level of ambient light in an environment of the AV, and determining to service the light of the AV further based on the level of ambient light.

8. The method of claim 1, further comprising determining a distance between the camera and the light of the AV, and determining to service the light of the AV further based on the distance between the camera and the light of the AV.

9. A non-transitory computer-readable medium storing instructions that, when executed by a processor, cause the processor to:
provide instructions to position an autonomous vehicle (AV) such that a light of the AV is within a field of view of a camera;
instruct the camera to capture an image of the field of view, the image comprising the light of the AV; and
determine to service the light of the AV based on the captured image.

10. The non-transitory computer-readable medium of claim 9, wherein the AV is a first AV, the camera is mounted on a second AV, the instructions further cause the processor to:
determine a location of the first AV relative to the second AV; and
wherein the instructions to position the AV relative to the camera comprise instructions to position the first AV such that the light of the first AV is within the field of view of the camera mounted on the second AV.

11. The non-transitory computer-readable medium of claim 9, wherein the camera is mounted on the AV, the instructions further cause the processor to:
determine a location of the AV relative to a mirror;
wherein the instructions to position the AV relative to the camera comprise instructions to perform at least one positioning maneuver to maneuver the AV such that the field of view of the camera mounted on the AV is positioned to capture a reflection of the light of the AV in the mirror.

12. The non-transitory computer-readable medium of claim 9, wherein the camera is mounted within a station within an AV facility, and the instructions to position the AV relative to the camera comprise instructions to perform at least one positioning maneuver to maneuver the AV such that light of the AV is positioned within the field of view of the camera mounted in the station.

13. The non-transitory computer-readable medium of claim 9, the instructions further cause the processor to:
prior to instructing the camera to capture the image of the field of view, instruct the light of the AV to switch on.

14. The non-transitory computer-readable medium of claim 9, wherein determining to service the light of the AV based on the captured image comprises:
determining a luminance of the light of the AV based on the captured image; and
determining that the luminance of the light of the AV is below a threshold luminance.

15. The non-transitory computer-readable medium of claim 9, wherein the instructions further cause the processor to:
receive a measurement of a level of ambient light in an environment of the AV; and
determine to service the light of the AV further based on the level of ambient light.

16. The non-transitory computer-readable medium of claim 9, wherein the instructions further cause the processor to:
determine a distance between the camera and the light of the AV; and
determine to service the light of the AV further based on the distance between the camera and the light of the AV.

17. A system for inspecting a light of an autonomous vehicle (AV) comprising:
a camera to capture images of a field of view of the camera; and
computing circuitry to:
instruct the AV to position itself such that the light of the AV is within the field of view of the camera;
receive an image captured by the camera, the image comprising the light of the AV; and
determine to service the light of the AV based on the captured image.

18. The system of claim 17, wherein the AV is a first AV, the camera is mounted on a second AV, and instructing the AV to position itself relative to the camera comprises:
determining a location of the first AV relative to the second AV; and
providing instructions to the first AV to position the first AV such that the light of the first AV is within the field of view of the camera mounted on the second AV.

19. The system of claim 17, wherein the camera is mounted on the AV, and instructing the AV to position itself relative to the camera comprises:
determining a location of the AV relative to a mirror; and
instructing the AV to perform at least one positioning maneuver to maneuver the AV such that the field of view of the camera mounted on the AV is positioned to capture a reflection of the light of the AV in the mirror.

20. The system of claim 17, wherein the camera is mounted within a station within an AV facility, and instructing the AV to position itself relative to the camera comprises:
instructing the AV to perform at least one positioning maneuver to maneuver the AV such that light of the AV is positioned within the field of view of the camera mounted in the station.

* * * * *